(12) United States Patent
Kondou et al.

(10) Patent No.: US 11,440,733 B2
(45) Date of Patent: Sep. 13, 2022

(54) PICKING ASSISTANCE SYSTEM AND ASSISTANCE METHOD

(71) Applicant: Hitachi Industrial Products, Ltd., Tokyo (JP)

(72) Inventors: Masaharu Kondou, Tokyo (JP); Ryota Kamoshida, Tokyo (JP); Hiroshi Yoshitake, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 227 days.

(21) Appl. No.: 16/650,293

(22) PCT Filed: Feb. 19, 2019

(86) PCT No.: PCT/JP2019/005965
§ 371 (c)(1),
(2) Date: Mar. 24, 2020

(87) PCT Pub. No.: WO2020/003588
PCT Pub. Date: Jan. 2, 2020

(65) Prior Publication Data
US 2020/0231383 A1   Jul. 23, 2020

(30) Foreign Application Priority Data
Jun. 27, 2018 (JP) .............................. JP2018-121477

(51) Int. Cl.
G06F 7/00 (2006.01)
B65G 1/137 (2006.01)
B65G 1/10 (2006.01)

(52) U.S. Cl.
CPC ............. *B65G 1/1373* (2013.01); *B65G 1/10* (2013.01)

(58) Field of Classification Search
CPC ...... B65G 1/1373; B65G 1/10; B65G 1/1378; G06Q 10/087; G06Q 50/28
(Continued)

(56) References Cited

U.S. PATENT DOCUMENTS 8,805,573 B2   8/2014 Brunner et al.
11,076,137 B1*  7/2021 Brazeau ............... H04N 9/3194
(Continued)

FOREIGN PATENT DOCUMENTS

JP   2012-521338 A   9/2012
JP   5329431 B2    10/2013
(Continued)

OTHER PUBLICATIONS

International Search Report (PCT/ISA/210) issued in PCT Application No. PCT/JP2019/005965 dated Apr. 23, 2019 with English translation (four (4) pages).
(Continued)

*Primary Examiner* — Yolanda R Cumbess
(74) *Attorney, Agent, or Firm* — Crowell & Moring LLP

(57) ABSTRACT

Provided is a picking assistance system that can improve work efficiency. A picking assistance system includes: a plurality of movable shelves configured to be able to accommodate at least one article; and a control device configured to control the movement of each of the shelves. The control device causes a series of processes of moving a sorting shelf selected from the shelves to a work station selected from a plurality of work station and moving articles from a deposit shelf disposed at the selected work station to the sorting shelf by a picking operation to be executed repeatedly while changing the work station until the sorting shelf accommodates prescribed articles.

11 Claims, 10 Drawing Sheets

(58) Field of Classification Search
USPC .................................. 700/213–216, 223, 228
See application file for complete search history.

(56) References Cited

U.S. PATENT DOCUMENTS

| | | | |
|---|---|---|---|
| 2008/0167884 A1* | 7/2008 | Mountz .............. | G06Q 10/0833 |
| | | | 705/29 |
| 2009/0185884 A1 | 7/2009 | Wurman et al. | |
| 2016/0229631 A1 | 8/2016 | Kimura et al. | |
| 2016/0355338 A1 | 12/2016 | Kazama et al. | |

FOREIGN PATENT DOCUMENTS

| | | | |
|---|---|---|---|
| JP | 2015-535787 A | 12/2015 | |
| WO | WO 2014/055716 A1 | 4/2014 | |
| WO | WO 2015/097736 A1 | 7/2015 | |
| WO | WO 2015/125217 A1 | 8/2015 | |

OTHER PUBLICATIONS

Japanese-language Written Opinion (PCT/ISA/237) issued in PCT Application No. PCT/JP2019/005965 dated Apr. 23, 2019 (six (6) pages).

Japanese-language Office Action issued in Japanese Application No. 2018-121477 dated Mar. 1, 2022 with English translation (eight (8) pages).

* cited by examiner

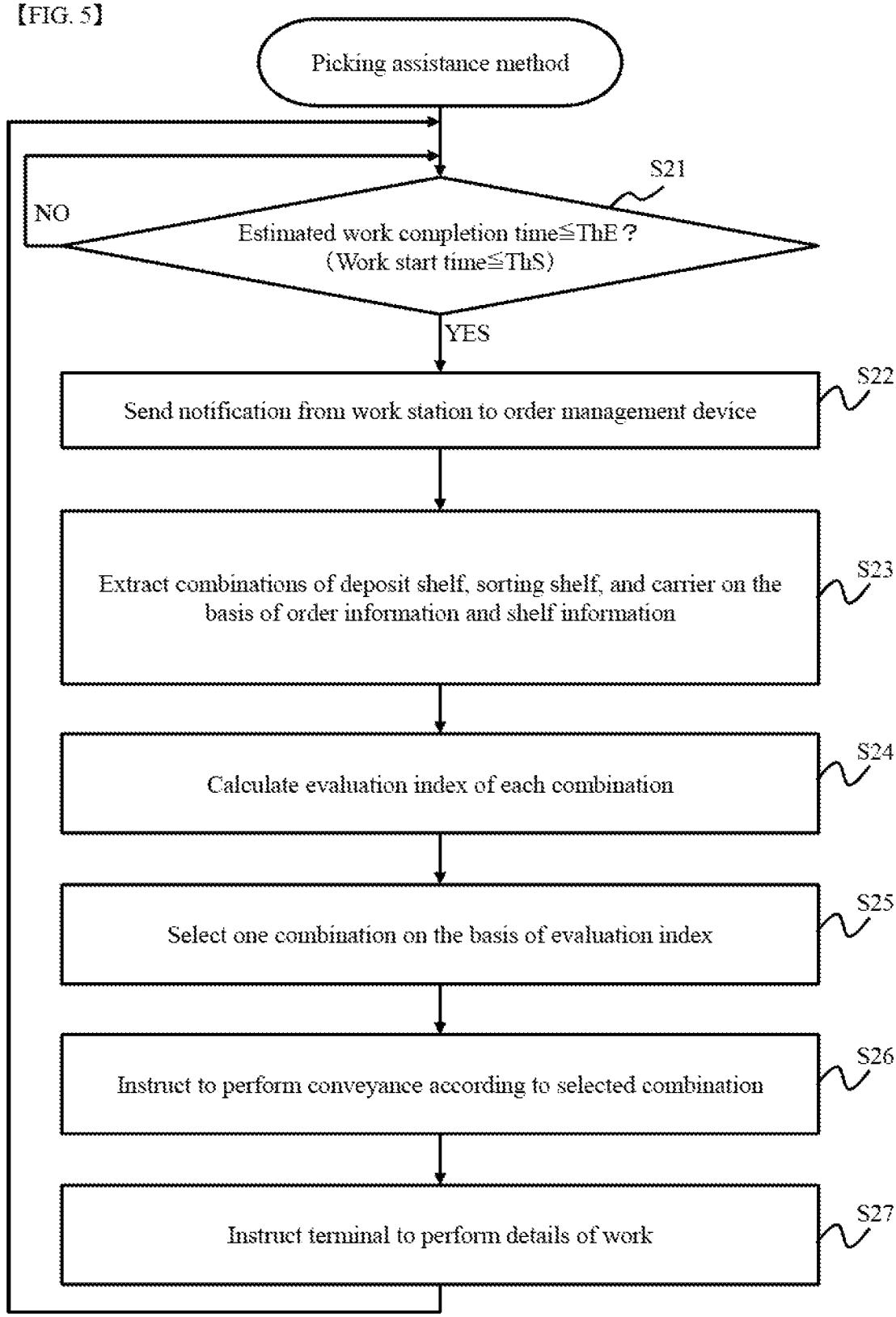

[FIG. 6]

| | | | | |
|---|---|---|---|---|
| Shelf-carrier combination table 30 | | | | |
| 301 | 302 | 303 | 304 | 305 |
| Combination No. | Deposit shelf | Sorting shelf | Carrier that conveys deposit shelf | Carrier that conveys sorting shelf |
| 1 | DS1 | SS2 | AC1 | AC2 |
| 2 | | | | AC3 |
| 3 | | | AC2 | AC1 |
| 4 | | | | AC3 |
| 5 | | | AC3 | AC1 |
| 6 | | | | AC2 |
| 7 | DS2 | SS1 | AC1 | AC2 |
| 8 | | | | AC3 |
| 9 | | | AC2 | AC1 |
| 10 | | | | AC3 |
| 11 | | | AC3 | AC1 |
| 12 | | | | AC2 |
| 13 | | SS2 | AC1 | AC2 |
| 14 | | | | AC3 |
| 15 | | | AC2 | AC1 |
| 16 | | | | AC3 |
| 17 | | | AC3 | AC1 |
| 18 | | | | AC2 |
| 19 | DS3 | SS1 | AC1 | AC2 |
| 20 | | | | AC3 |
| 21 | | | AC2 | AC1 |
| 22 | | | | AC3 |
| 23 | | | AC3 | AC1 |
| 24 | | | | AC2 |

[FIG. 7]

| Shelf movable time management table 31 ||
|---|---|
| 311 | 312 |
| Shelf | Estimated time for shelf to be movable |
| DS1 | 0 sec |
| DS2 | 10 sec |
| DS3 | 0 sec |
| SS1 | 0 sec |
| SS2 | 5 sec |

[FIG. 8]

| | DS1 | DS2 | DS3 | SS1 | SS2 |
|---|---|---|---|---|---|
| AC1 | 15 sec | 40 sec | 25 sec | 0 sec | 30 sec |
| AC2 | 65 sec | 70 sec | 70 sec | 65 sec | 75 sec |
| AC3 | 25 sec | 10 sec | 20 sec | 30 sec | 10 sec |

Required carrier moving time management table 32

| \[Estimated required shelf moving time management table 33\] ||
|---|---|
| 331 | 332 |
| Shelf | Estimated time required for moving to work station WS2 |
| DS1 | 0 sec |
| DS2 | 60 sec |
| DS3 | 20 sec |
| SS1 | 0 sec |
| SS2 | 20 sec |

[FIG. 10]

| Shelf-carrier combination table 30A | | | | | |
|---|---|---|---|---|---|
| Combination No. (301) | Deposit shelf (302) | Sorting shelf (303) | Carrier that conveys deposit shelf (304) | Carrier that conveys sorting shelf (305) | Evaluation index (306) |
| 1 | DS1 | SS2 | AC1 | AC2 | 95 |
| 2 | | | | AC3 | 30 |
| 3 | | | AC2 | AC1 | 65 |
| 4 | | | | AC3 | 65 |
| 5 | | | AC3 | AC1 | 50 |
| 6 | | | | AC2 | 95 |
| 7 | DS2 | SS1 | AC1 | AC2 | 100 |
| 8 | | | | AC3 | 100 |
| 9 | | | AC2 | AC1 | 130 |
| 10 | | | | AC3 | 130 |
| 11 | | | AC3 | AC1 | 70 |
| 12 | | | | AC2 | 70 |
| 13 | | SS2 | AC1 | AC2 | 100 |
| 14 | | | | AC3 | 100 |
| 15 | | | AC2 | AC1 | 130 |
| 16 | | | | AC3 | 130 |
| 17 | | | AC3 | AC1 | 70 |
| 18 | | | | AC2 | 95 |
| 19 | DS3 | SS1 | AC1 | AC2 | 65 |
| 20 | | | | AC3 | 45 |
| 21 | | | AC2 | AC1 | 90 |
| 22 | | | | AC3 | 90 |
| 23 | | | AC3 | AC1 | 45 |
| 24 | | | | AC2 | 65 |

PICKING ASSISTANCE SYSTEM AND ASSISTANCE METHOD

TECHNICAL FIELD

The present invention relates to a picking assistance system and an assistance method.

BACKGROUND ART

Workers perform a picking operation in a warehouse or a plant. A picking operation is an operation in which a worker collects articles as instructed in an order from deposited articles and sorting the articles to a shipping destination.

Conventionally, a worker walks in a warehouse in which a plurality of shelves for accommodating articles is disposed and picks out a prescribed article corresponding to an order from a target shelf. In contrast, in recent years, a picking assistance system for automatically conveying a shelf for storing articles to a worker using an unmanned carrier and allowing the worker to pick out articles from the shelf has been proposed (Patent Literatures 1 and 2).

NPL 1 discloses a technique of automatically conveying target articles or a shelf in which the target articles are stored to a picking station in a distribution warehouse.

NPL 2 discloses a technique of conveying a shelf in which target articles and boxes for sorting the target articles to the place of a worker in a distribution warehouse and allowing the worker to execute a picking operation. After that, the shelf is moved to a storage space according to an event.

CITATION LIST

Patent Literature

[PTL 1]
U.S. Pat. No. 8,805,573
[PTL 2]
Japanese Patent No. 5329431

SUMMARY OF INVENTION

Technical Problem

The conventional techniques merely move a shelf that stores a target article of a picking operation to a worker but do not discuss how to move a sorting shelf that accommodates articles picked out from the shelf.

The present invention has been made in view of the above-described problems, and an object thereof is to provide a picking assistance system and an assistance method capable of improving work efficiency.

Solution to Problem

In order to solve the problems, a picking assistance system according to the present invention includes: a plurality of movable shelves configured to be able to accommodate at least one article; and a control device configured to control the movement of each of the shelves, wherein the control device causes a series of processes of moving a sorting shelf selected from the shelves to a work station selected from a plurality of work stations and moving an article from a deposit shelf disposed at the selected work station to the sorting shelf by a picking operation to be executed repeatedly while changing the work station until the sorting shelf accommodates a prescribed article.

Advantageous Effects of Invention

According to the present invention, it is possible to execute a prescribed series of processes of moving a sorting shelf to a work station and performing a picking operation at the moving place until the sorting shelf accommodates a prescribed article while changing a work station.

BRIEF DESCRIPTION OF DRAWINGS

FIG. 5 is a flowchart of a picking assistance method according to a second embodiment.
FIG. 6 is a table for determining combinations of a deposit shelf, a sorting shelf, and a carrier.
FIG. 7 is a table for managing an estimated time for a shelf to be movable.
FIG. 8 is a table for managing a time required for a carrier to arrive at a shelf.
FIG. 9 is a table for managing a time required for a shelf to arrive at a Work Station.
FIG. 10 is a table for managing combinations of a deposit shelf, a sorting shelf, and a carrier and an evaluation index of these combinations.

DESCRIPTION OF EMBODIMENTS

Hereinafter, an embodiment of the present invention will be described with reference to the drawings. A picking assistance system according to the present embodiment allows an article as described in an order to be accommodated while moving a sorting shelf between a plurality of Work Stations. That is, in a picking assistance system according to the present embodiment, a sorting shelf as well as a deposit shelf can move inside a warehouse, for example, a plurality of sorting shelves and a plurality of deposit shelves move between a plurality of Work Stations provided in the warehouse whereby prescribed articles are accommodated in a sorting shelf to accomplish the sorting shelf. The Work Station corresponds to a "work station", a "prescribed position", and a "subsequent prescribed position".

As described above, in the present embodiment, a sorting shelf (an article accommodation shelf) is first conveyed to a prescribed Work Station, the articles in a deposit shelf are accommodated in the sorting shelf which is subsequently conveyed to a subsequent prescribed Work Station, and other articles are accommodated therein from the other deposit shelf. In this manner, the sorting shelf accommodates articles while moving across a plurality of prescribed Work Stations. The sorting shelf having articles (prescribed articles) as indicated in an order moves to a shipping station, for example, and the prescribed articles are picked out for shipping. The sorting shelf from which the prescribed articles are picked out is returned to a shelf storage space provided in the warehouse. The deposit shelf and the sorting shelf basically have the same structure, but the shapes or colors, and the accessories thereof may be different. A sorting shelf waiting at a shelf storage space is generally in a state (an empty state) where no article is accommodated therein, whereas it is thought that a deposit shelf waiting at a shelf storage space often stores one or a plurality of articles. However, a deposit shelf from which all articles accommodated therein are picked out by a picking operation is an empty state until articles are refilled.

Figure 1:
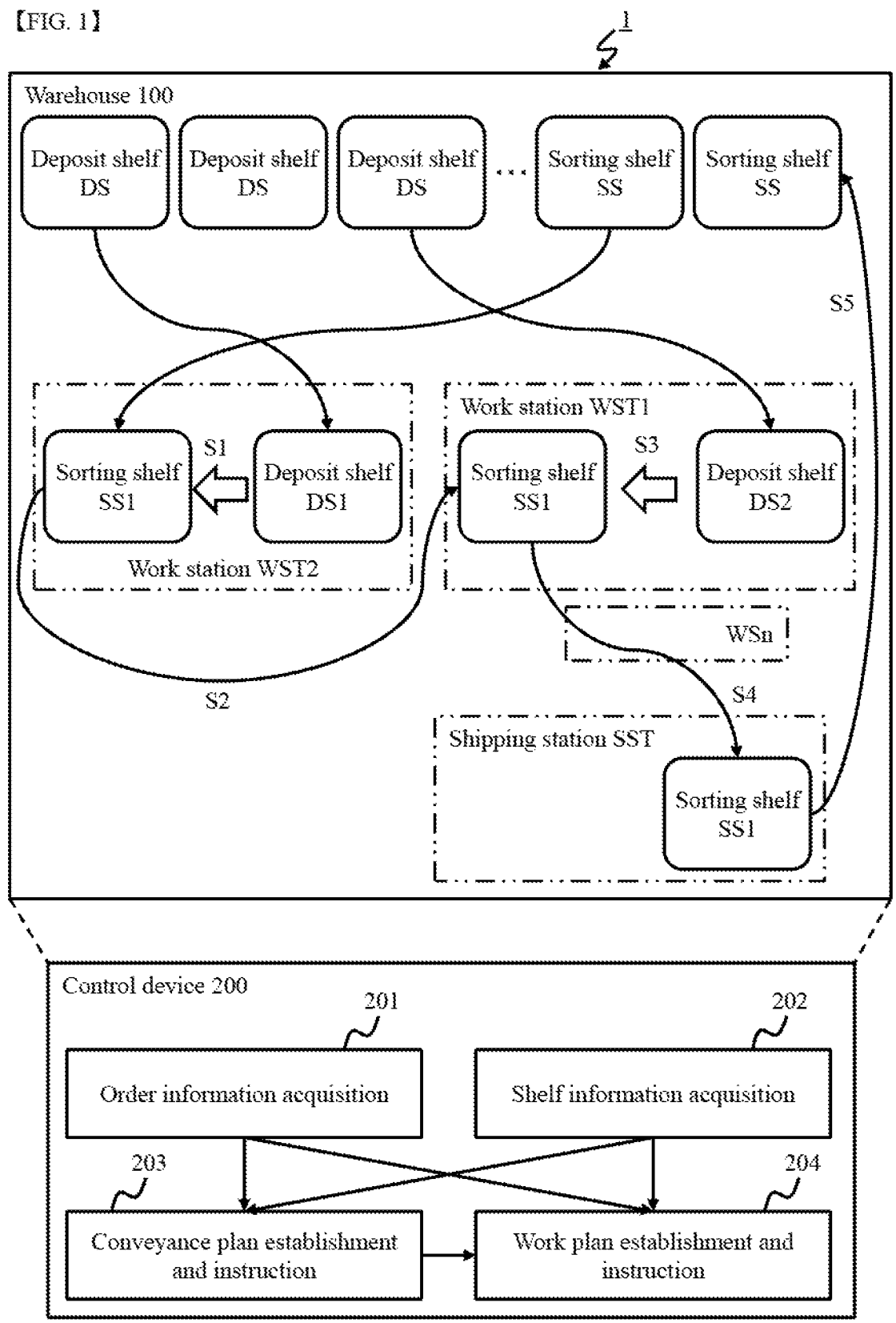
FIG. 1 is an overview diagram of a picking assistance system according to the present embodiment.

As illustrated in FIG. 1, a picking assistance system 1 is applied to a facility such as, for example, a distribution warehouse 100, in which articles are deposited and sorted.

One area in the warehouse 100 is a shelf storage space (also referred to as a storage area). A plurality of movable shelves DS and SS is provided in the shelf storage space. The shelves DS and SS basically have the same structure and include an accommodation portion for accommodating at least one article Gd. A first shelf among the plurality of shelves is a deposit shelf DS that deposits target articles of a picking operation. A second shelf among the plurality of shelves is a sorting shelf SS in which articles are accommodated.

The other area in the warehouse 100 is a work area. A plurality of Work Stations WST is provided in the work area. When one or a plurality of deposit shelves DS and one sorting shelf SS arrive at the Work Station, a worker picks out articles from the deposit shelf DS and accommodates the same in the sorting shelf SS. Until the prescribed articles are accommodated in the sorting shelf SS, the sorting shelf SS moves between prescribed Work Stations.

When all the prescribed articles are accommodated in the sorting shelf SS, the sorting shelf SS are conveyed to a shipping station SST and the prescribed articles are picked out. The empty sorting shelf SS is returned to a shelf storage space.

The movement of the shelves DS and SS and the instruction of a picking operation in the Work Stations are controlled by the control device 200. The control device 200 can be configured using a computer including, for example, an arithmetic device, a memory, an auxiliary storage device, an input/output circuit, a communication circuit, and a user interface device (all of which are not illustrated). The arithmetic device executes a prescribed computer program called into a memory, whereby the functions 201 to 204 of the picking assistance system 1 to be described later are realized.

The control device 200 includes, for example, an order information acquisition function 201, a shelf information acquisition function 202, a conveyance plan establishment and instruction function 203, and a work plan establishment and instruction function 204.

The order information acquisition function 201 is a function of acquiring order information from an order reception server, an inventory management system, or the like (which is not illustrated). The order information is information that specifies the type and the number of articles to be picked out and delivered (shipped) from the warehouse 100.

The shelf information acquisition function 202 is a function of acquiring information on the shelves DS and SS disposed in the warehouse 100. The shelf information includes, for example, the type (a deposit shelf DS or a sorting shelf SS) of a shelf, the position of a shelf, the number of an unmanned carrier allocated to a shelf, a moving speed of a shelf, and the type and the number of articles accommodated in a shelf.

The conveyance plan establishment and instruction function 203 is a function of establishing a conveyance plan that defines when and to which Work Station WST the shelves DS and SS are to be moved and giving an instruction to unmanned carriers allocated to the shelves according to the conveyance plan.

The work plan establishment and instruction function 204 is a function that establishes a picking operation plan in each Work Station, and which leads to the outputting of an instruction on the details of the operation to a terminal PC provided in each Work Station. The work plan includes the details of an operation indicating which and how many articles are to be moved from which deposit shelf DS in which Work Station to which sorting shelf SS. The details of the operation performed in each Work Station are displayed on the terminal PC correlated with the Work Station. A worker transfers articles between the deposit shelf DS and the sorting shelf SS having arrived at the Work Station according to the details of the operation displayed on the terminal PC.

The above-described embodiment has the following features. That is, the picking assistance system 1 according to the present embodiment performs step S1 of performing sorting of articles from a first deposit shelf DS1 to a sorting shelf SS1 at a first position (a prescribed position) WST2 and step S2 of the sorting shelf SS1 moving to a second position (a subsequent prescribed position) WST1 using a carrier, and step S3 of performing sorting of articles from a second deposit shelf DS2 to the sorting shelf SS1 at the second position.

When prescribed articles indicated by prescribed instruction information (order information) cannot be accommodated in the sorting shelf SS1 using two Work Stations WST2 and WST1 only, the sorting shelf SS1 is conveyed to still another position (also referred to as a third position or still another prescribed position) and articles are accommodated therein. The picking operation may be performed four or five times without being limited to three times. The sorting shelf SS1 moves across a plurality of Work Stations until all the instructed prescribed articles are accommodated, and a picking operation is performed in the respective Work Stations.

Upon accommodating the prescribed articles, the sorting shelf SS1 is conveyed to the shipping station SST to deliver the prescribed articles accommodated therein (step S4). The prescribed articles picked out from the sorting shelf SS1 are packaged and shipped. The sorting shelf SS1 from which the prescribed articles are picked out is returns to a shelf storage space and performs standby (step S5).

In the picking assistance system 1, the second deposit shelf DS2 may be the same as the first deposit shelf DS1 that performs a sorting operation (a picking operation) at the first position WST2.

In the picking assistance system 1, the second deposit shelf DS2 may be different from the first deposit shelf DS1 that performs a sorting operation (a picking operation) at the first position WST2.

In the picking assistance system 1, the sorting shelf SS is moved from the first position WST2 to the second position WST1 when a sorting operation at the second position WST1 satisfies a prescribed condition, or when a sorting operation at the first position WST2 is completed.

The prescribed condition may be that an estimated time required for completion of a sorting operation at the second position WST1 is equal to or smaller than a prescribed threshold.

The time (an estimated operation completion time) required for completion of a sorting operation may be calculated on the basis of at least one of the number of articles to be picked out from the deposit shelf DS, the number of types thereof, and the number of sorting destinations thereof.

The sorting shelf SS moving to the second position WST1 may be determined to be conveyed to the second position WST1 on the basis of an estimated start time of a sorting operation executed between the sorting shelf SS and the second deposit shelf DS2 at the second position WST1.

The estimated sorting operation start time may be calculated using at least one of an estimated time required for the second deposit shelf DS2 to arrive at the second position WST1 and an estimated time required for the sorting shelf SS to arrive at the second position WST1.

According to the present embodiment, it is possible to convey the sorting shelf SS1 between a plurality of different positions WST and perform a sorting operation at the respective positions WST. Therefore, the picking assistance system 1 of the present embodiment can improve the efficiency of a picking operation.

First Embodiment

Figure 2:
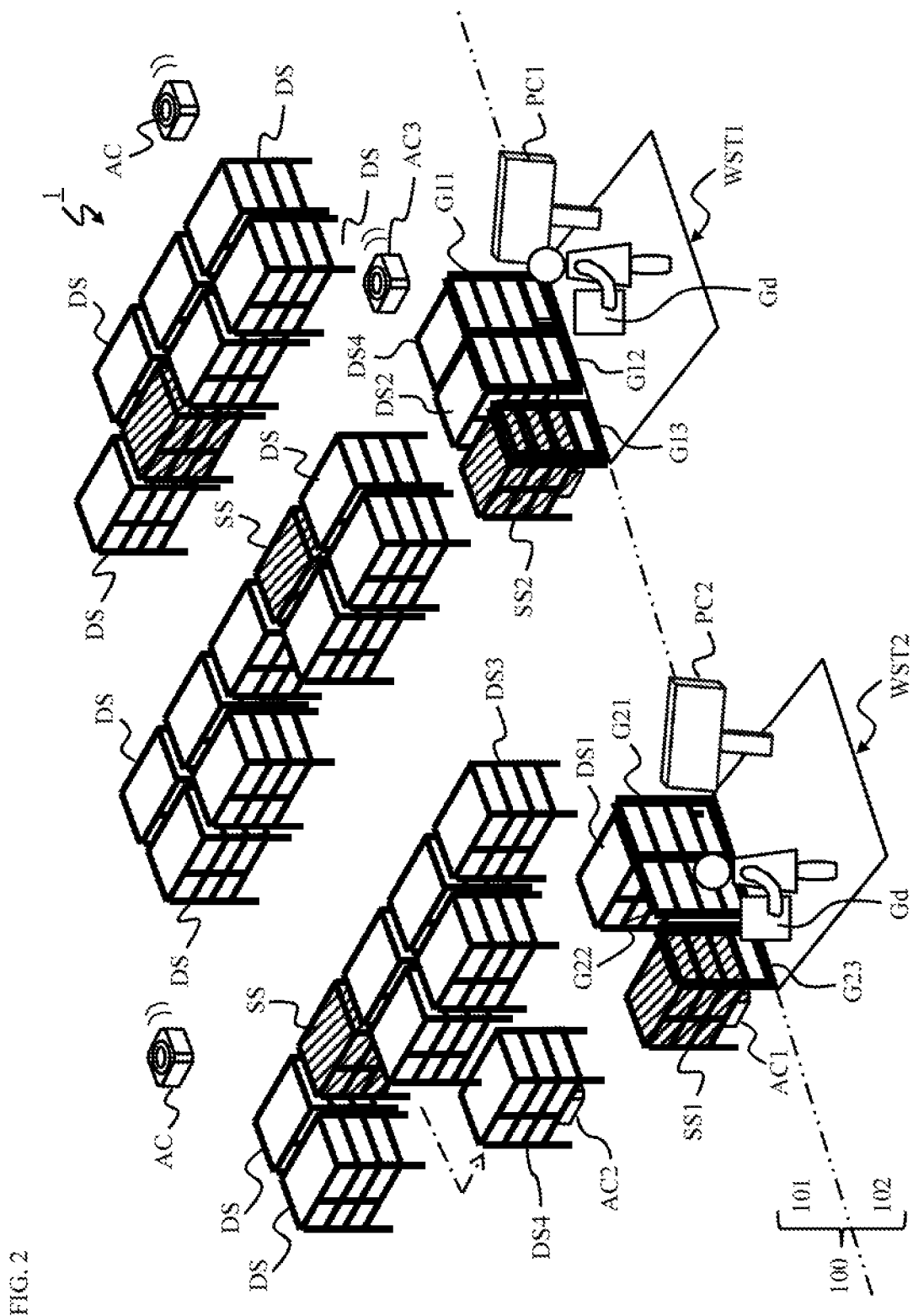
FIG. 2 is an explanatory diagram illustrating the state of a warehouse to which a picking assistance system is applied.

A first embodiment will be described with reference to FIGS. 2 to 4. FIG. 2 is an explanatory diagram illustrating an overview of a picking operation performed in the warehouse 100. A deposit area 101 in which articles are deposited and a work area 102 in which a picking operation (a sorting operation) is performed are set in the warehouse 100. The shipping station described in FIG. 1 is omitted in FIG. 2.

A plurality of deposit shelves DS and a plurality of sorting shelves SS are disposed in the deposit area 101. Each deposit shelf DS store at least one type of articles. A plurality of carriers AC is disposed in the deposit area 101. The carrier AC is controlled by an operation management device 230 to be described later.

In the present embodiment, the shelves DS and SS and the carriers AC are uncorrelated so that combinations of both have a degree of freedom. In this way, it is possible to flexibly establish a shelf conveyance plan, and workability of a maintenance operation of inspection and replacement of the carriers AC is improved. Although such an advantage is obtained, at least some of the carriers AC may be correlated with specific shelves. For example, the carrier AC may be fixedly attached to a lower part of a shelf and a specific carrier AC may always be allocated to a specific shelf.

The carrier AC moves from the operation management device 230 to a designated deposit shelf DS or sorting shelf SS. When the carrier AC moves immediately below the deposit shelf DS or the sorting shelf SS, the deposit shelf DS or the sorting shelf SS are lifted directly upward by a jack mechanism (not illustrated) provided on an upper surface of the carrier AC. The carrier AC moves to a designated Work Station WST1 or WST2 in the work area 102 while lifting the deposit shelf DS or the sorting shelf SS. For the sake of convenience, the Work Stations WST1 and WST2 will be denoted by a Work Station WST when both are not distinguished from each other.

Upon arriving at the Work Station WST designated from the operation management device 230, the carrier AC unloads the deposit shelf DS or the sorting shelf SS on a floor. When an operation (a sorting operation or a picking operation) of transferring articles deposited in the deposit shelf DS to the sorting shelf SS ends, the carrier AC lifts the deposit shelf DS or the sorting shelf SS again and moves. The carrier AC returns the deposit shelf DS or the sorting shelf SS to its original position or moves the deposit shelf DS or the sorting shelf SS to another Work Station WST.

A plurality of Work Stations WSTi (i is an integer of $1 \leq i \leq n$, n is an integer of 2 or more and indicates a total number of Work Stations WST, and in this example, n=2) is present in the work area 102.

The Work Station WSTi has a gate Gij (i is an integer of $1 \leq j \leq m$, m is an integer of 2 or more and indicates a total number of gates Gij per Work Station WSTi, and in this example, m=2) and a terminal PCi.

The gate Gij is an arrival point of the deposit shelf DS and the sorting shelf SS. One gate Gij corresponds to one deposit shelf DS or sorting shelf SS. A prescribed gate among the gates G provided in the Work Station corresponds to the deposit shelf DS, and another prescribed gate corresponds to the sorting shelf SS. For example, in the case of the Work Station WST1, the deposit shelf DS corresponds to gates G11 and G12, and the sorting shelf SS corresponds to a gate G13.

In the present embodiment, each Work Station WST can accept a plurality of deposit shelves DS and one sorting shelf SS. In this way, as compared to a case where it is possible to accept only one deposit shelf DS and only one sorting shelf DS, since it is possible to shorten a changing time of the deposit shelf DS, it is possible to improve efficiency of a picking operation. Furthermore, during a picking operation from the deposit shelf DS having arrived at one gate G11 of the gates G11 and G12 for the deposit shelf to the sorting shelf SS1, the deposit shelf DS used for a subsequent picking operation can be accepted in the other gate G12. In this way, it is possible to perform a picking operation to different sorting shelves SS continuously, and improve the work efficiency.

The terminal PCi is a computer that displays information transmitted from the order management device 220 and is operated by the worker Wi. The terminal PC may be a physical computer terminal provided in the Work Station WST or may be a virtual terminal projected by a headset worn on a worker.

Figure 3:
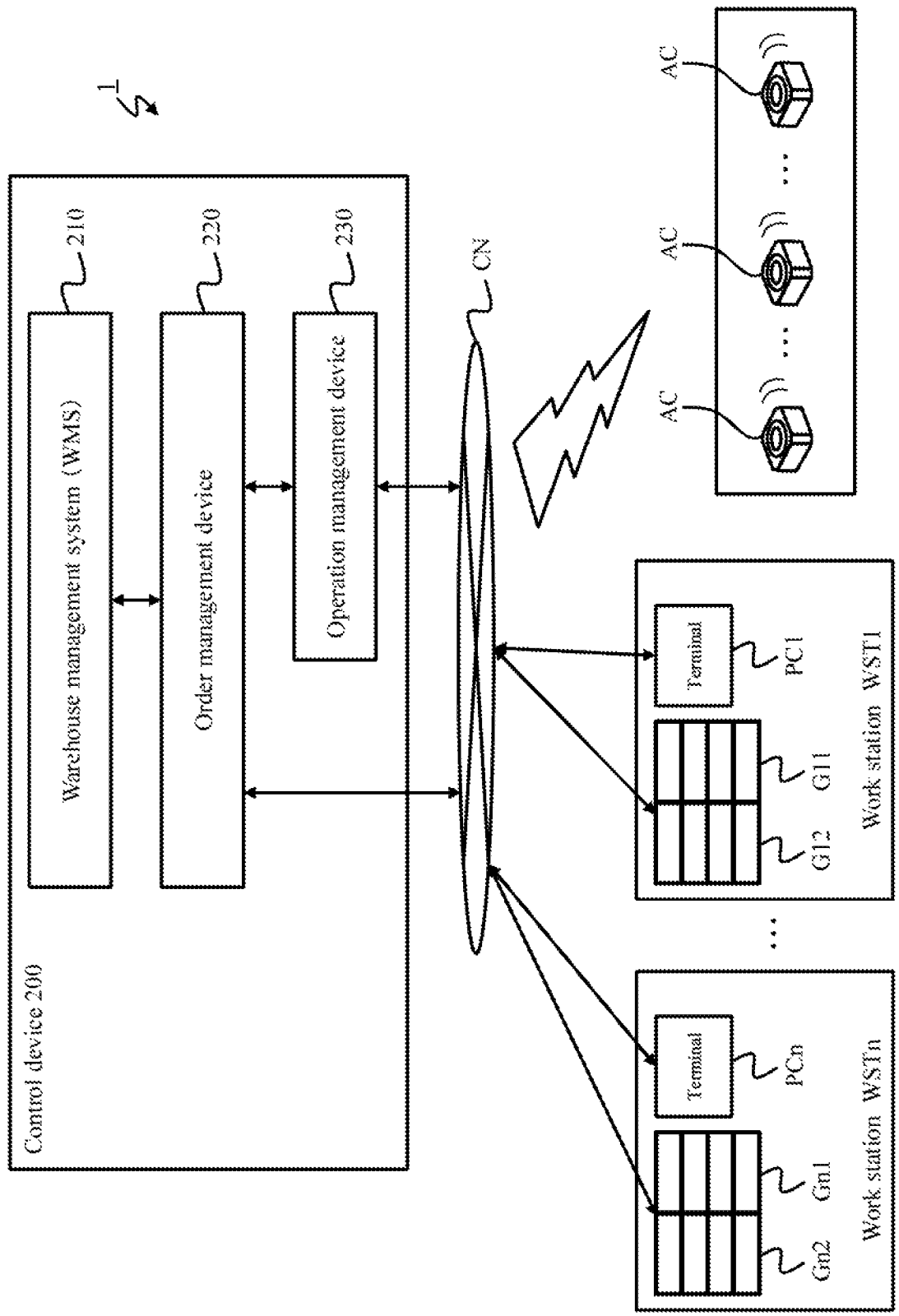
FIG. 3 is a functional configuration diagram of the picking assistance system.
Figure 4:
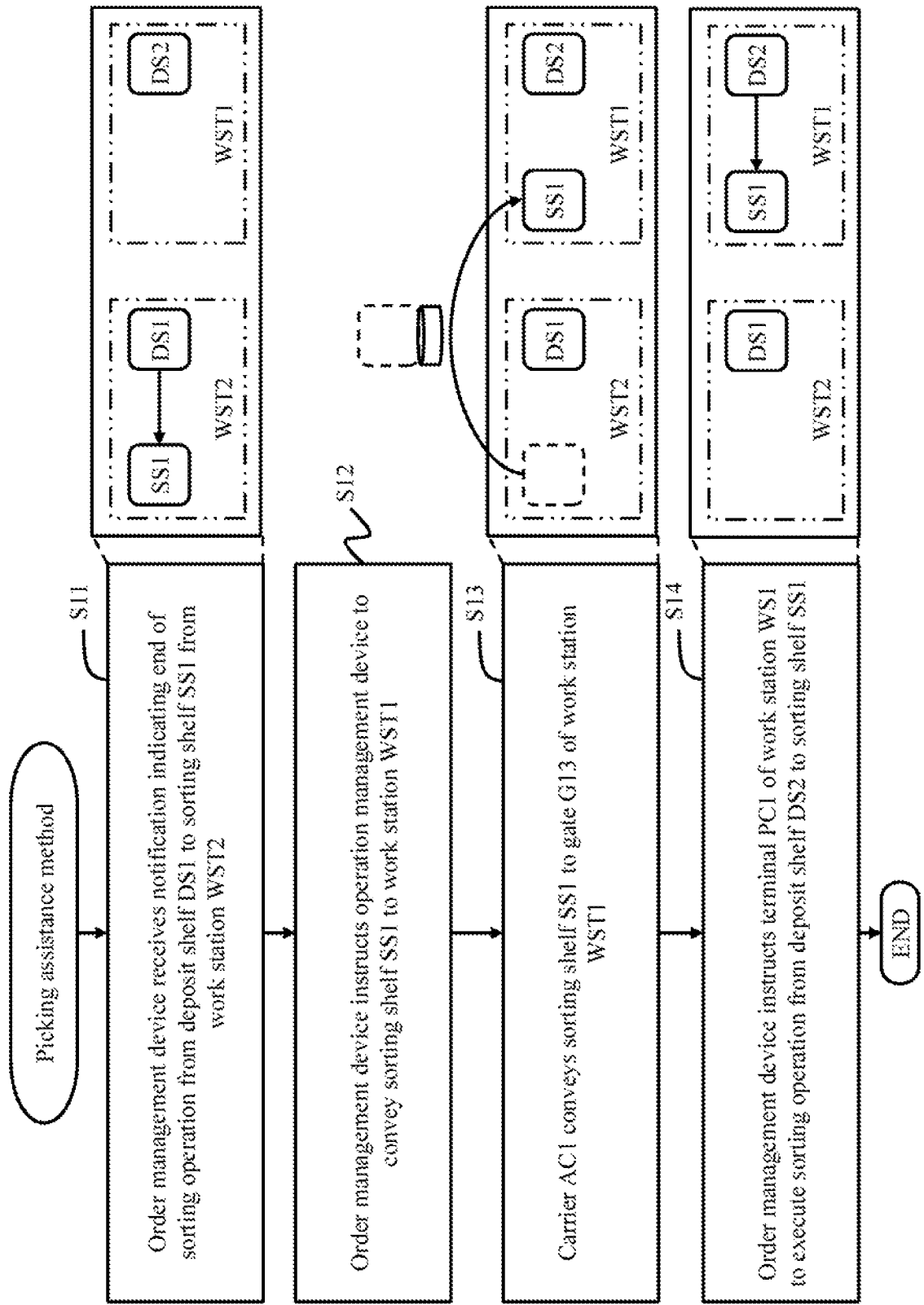
FIG. 4 is a flowchart of a picking assistance method.

FIG. 3 is an explanatory diagram illustrating a control configuration of the picking assistance system 1. The picking assistance system 1 includes at least one control device 200, a plurality of carriers AC, a plurality of terminals PCi, and a plurality of gates Gij.

The control device 200 includes, for example, a warehouse management system 210, an order management device 220, and an operation management device 230. Hereinafter, the warehouse management system 210 will be referred to as a WMS (Warehouse Management System). The devices 210, 220, and 230 may be configured as separate devices and may be connected bidirectionally communicable via a network. Alternatively, the functions of the devices 210 to 230 may be provided in one physical computer. Alternatively, the order management device 220 and the operation management device 230 may be provided in parallel, and the WMS 210 may control the order management device 220 and the operation management device 230 in cooperation.

The WMS 210 is communicably connected to the order management device 220. The order management device 220 is communicably connected to the operation management device 230. The order management device 220, the operation management device 230, the carriers AC, the terminals PCi, and the gates Gij are communicably connected via a communication network CN. The carriers AC are connected to the communication network CN via a wireless communication device (not illustrated). In this way, the carriers AC are bidirectionally communicably connected to the operation management device 230 via the communication network CN. At least some of the gates Gij and at least some of the terminals PCi may be wirelessly connected to the communication network CN.

The WMS 210 controls the order management device 220. For example, the WMS 210 transmits order information, deposit shelf data, and sorting shelf data, for example, to the order management device 220. An order is information including an article name of an article, the number of articles, and a delivery destination. The deposit shelf data is data related to a shelf DS in which an article is deposited. The sorting shelf data is data related to a sorting shelf SS that sorts articles. The order management device 220 controls the operation management device 230. For example, upon receiving a notification of the end of a sorting operation from a Work Station WSTn, the order management device 220 instructs the operation management device 230 to return the deposit shelf DS and the sorting shelf SS to their original positions.

An example of correspondence between the control configuration described in FIG. 1 and the control configuration illustrated in FIG. 3 will be described. For example, the order information acquisition function 201 and the shelf information acquisition function 202 are provided in the WMS 210. The conveyance plan establishment and instruction function 203 and the work plan establishment and instruction function 204 are provided in the order management device 220.

A picking assistance process will be described with reference to the flowchart of FIG. 4. In the following description, "step" is sometimes abbreviated as "S".

The order management device 220 receives a notification of the end of a sorting operation from the deposit shelf DS1 to the sorting shelf SS1 from the terminal PC2 of the Work Station WST2 (S11). The order management device 220 instructs the operation management device 230 to move the sorting shelf SS1 from the Work Station WST2 to the Work Station WST1 (S12).

The operation management device 230 instructs the carrier AC1 to convey the sorting shelf SS1 to the gate G13 of the Work Station WST1 according to the instruction from the order management device 220 (S13). The carrier AC1 conveys the sorting shelf SS1 to the gate G13 of the Work Station WST1 according to the instruction from the operation management device 230.

The order management device 220 transmits a message for notifying the terminal PC1 of the Work Station WST1 of the details of an operation (S14). When the message is displayed on the terminal PC1, the worker W1 starts a sorting operation from the deposit shelf DS2 to the sorting shelf SS1.

According to the present embodiment, the sorting shelf SS1 can be conveyed between a plurality of work station (WST) positions and a sorting operation can be performed in the respective positions WST. In this way, the picking assistance system 1 of the present embodiment can improve the efficiency of a picking operation.

Second Embodiment

A second embodiment will be described with reference to FIGS. 5 to 10. In the present embodiment, a difference from the first embodiment will be mainly described.

FIG. 5 is a flowchart of a picking assistance process according to the present embodiment. The terminal PC2 of the Work Station WST2 monitors whether an estimated operation completion time (a remaining operation time) estimated to be required for completion of a sorting operation from the deposit shelf DS1 to the sorting shelf SS1 is equal to or smaller than a prescribed threshold ThE (S21). When the estimated operation completion time is equal to or smaller than the threshold ThE (S21: YES), the terminal PC1 sends a notification thereof to the order management device 220 (S22).

The estimated operation completion time can be determined appropriately, for example, on the basis of the number of articles related to a sorting operation from the deposit shelf DS1 to the sorting shelf SS1, the number of types of the articles, the number of sorting destinations thereof, and the like. A notification may be transmitted to the order management device 220 before completion of the sorting operation rather than transmitting the notification to the order management device 220 upon completion of the operation. In this way, the efficiency of the picking operation can be further improved.

The order management device 220 extracts a combination of the deposit shelf DS, the sorting shelf SS, and the carrier AC to be conveyed to the Work Station WST2 (S23).

FIG. 6 illustrates an example of a table 30 showing a combination of a shelf and a carrier. The table 30 illustrates the extraction results of the combinations of the deposit shelf DS, the sorting shelf SS, and the carrier AC conveyed to the Work Station WST2.

The table 30 includes a combination number 301, a deposit shelf 302, a sorting shelf 303, a carrier 304 that conveys a deposit shelf, and a carrier 305 that conveys a sorting shelf. The combination number 301 is information for identifying a combination. The deposit shelf 302 is information for specifying the deposit shelf DS related to the combination. The sorting shelf 303 is information for specifying the sorting shelf SS related to the combination. The carrier 304 that conveys a deposit shelf is information for specifying a carrier AC that conveys the deposit shelf DS related to the combination. The carrier 305 that conveys a sorting shelf is information for specifying a carrier AC that conveys the sorting shelf SS related to the combination.

The combination of the deposit shelf DS and the sorting shelf SS is extracted to process a non-processed order among the orders transmitted from the WMS 210 to the order management device 220.

Description will be continued by returning to FIG. 5. The order management device 20 calculates an evaluation index for each of the extracted combinations of the deposit shelf DS, the sorting shelf SS, and the carrier AC (S24).

FIGS. 7 to 9 are examples of information used for calculating the evaluation index. A table 31 in FIG. 7 illustrates an estimated time for the deposit shelf DS and the sorting shelf SS to be movable to the Work Station WST2. For example, the table 31 includes a shelf 311 and an estimated time 312 until a shelf can be moved. The shelf 311 is information for specifying a target shelf DS or SS. The estimated time 312 indicates a time required for the shelf specified by the shelf 311 to be movable to the Work Station WST2.

In FIG. 7, since the deposit shelf DS1 and the sorting shelf SS1 are already present in the Work Station WST2, the estimated moving time is "0 sec". It is assumed that the deposit shelf DS2 is presently used for a sorting operation in the Work Station WST1. The time required for the deposit shelf DS2 to be movable to the Work Station WST2 is estimated as "10 sec" on the basis of the number of articles for a remaining sorting operation or the like. Since the deposit shelf DS3 and the sorting shelf SS2 are presently waiting in the storage area 101, the time for the shelf to be movable is estimated as "0 sec".

FIG. 8 is a table 31 illustrating an estimated time required for the carrier AC to move to the position of the deposit shelf DS or the sorting shelf SS. For example, the table 32 includes a carrier 321 and a required arrival time 322 required for arriving at a target shelf. The carrier 321 is information for specifying the carrier AC. The required arrival time 322 required for arriving at a target shelf is an estimated time required for a specified carrier AC to arrive at a target shelf DS or SS.

An estimated time required for the carrier AC to arrive at a target shelf can be estimated appropriately on the basis of the distance between the carrier AC and the target shelf, for example. When the carrier AC is conveying a target shelf, the time required for the carrier AC to arrive at the target shelf is "0 sec". When the carrier AC is conveying another shelf different from the target shelf, the estimated time required for the carrier AC to arrive at the position of the target shelf also includes the time required for the carrier AC to complete conveying of the other shelf. When the carrier AC has conveyed another shelf to the Work Station WST and is waiting for completion of a sorting operation at the Work Station WST, the estimated time required for the carrier AC to arrive at the position of the target shelf also includes the time required for completion of a sorting operation.

Description will be continued by way of an example of FIGS. 2 and 8. As illustrated in FIG. 2, the carrier AC2 is conveying a deposit shelf DS4. Therefore, the estimated time required for the carrier AC2 to move to the positions of the deposit shelves DS1 to DS3 and the sorting shelves SS2 and SS3 includes the time required for the carrier AC2 to complete conveying of the deposit shelf DS4. In FIG. 2, the carrier AC1 holds the sorting shelf SS1 and waits at the Work Station WST2. Therefore, although the estimated time required for the carrier AC1 to move to the position of the sorting shelf SS1 is "0 sec", the estimated time required for the carrier AC1 to move to the positions of the deposit shelves DS1 to DS3 and the sorting shelf SS2 includes the estimated time required for completion of a sorting operation of the sorting shelf SS1.

FIG. 9 is a table 33 illustrating an estimated time required for moving the deposit shelf DS and the sorting shelf SS to the Work Station WST2. For example, the table 33 includes a shelf 331 and an estimated required time 332 for the shelf to move to the Work Station WST2.

The shelf 331 is information for specifying a target shelf. The estimated required time 332 is an estimated time required for a target shelf to arrive at the Work Station WST2. The estimated required moving time 332 can be calculated appropriately on the basis of the distance between the target shelf and the Work Station WST2. In the example of FIG. 2, since the deposit shelf DS1 and the sorting shelf SS1 are already at the Work Station WST2, the estimated time is "0 sec". Since the deposit shelf DS2 waits for completion of a sorting operation at another Work Station WST1, the estimated time is estimated as "60 sec" by taking an estimated time required for completion of a sorting operation and a time required for moving from the Work Station WST1 to the Work Station WST2 into consideration.

A table 30A illustrated in FIG. 10 is one in which the evaluation index 306 is added to the table 30 described in FIG. 6. The evaluation index is calculated by using information illustrated in FIGS. 7 to 9 as an estimated time required for a combination of the deposit shelf DS, the sorting shelf SS, and the carrier AC to start a sorting operation at the Work Station WST2.

In this case, the evaluation index may be calculated as a simple sum of the respective estimated times described in FIGS. 7 to 9. In contrast, in the present embodiment, the evaluation index is calculated more precisely rather than the simple sum of the estimated times described in FIGS. 7 to 9.

For example, in FIG. 7, the estimated time for the sorting shelf SS2 to be movable is "5 sec". The estimated time required for the carrier AC3 to move to the position of the sorting shelf SS2 is "10 sec". Therefore, it can be estimated that an operation of the sorting shelf SS2 at the Work Station WST1 is completed when the carrier AC3 moves to the position of the sorting shelf SS2. In this case, it is not necessary to consider the estimated time for the sorting shelf SS2 to be movable as an evaluation index.

Similarly, a case in which it is estimated that the time required for the carrier AC1 to convey the deposit shelf DS1 and be able to start an operation at the Work Station WST2 is "15 sec", and it is estimated that the time required for the carrier AC3 to convey the sorting shelf SS2 and be able to start an operation at the Work Station WST2 is "30 sec" will be discussed. In this case, it may be estimated that the time required for the combination of the carrier AC1 and the deposit shelf DS1 and the carrier AC3 and the sorting shelf SS2 to be able to start an operation at the Work Station WST2 is "30 sec" which is the longer one of "15 sec" and "30 sec". That is, in the present embodiment, a substantial required time is estimated rather than simply summing the estimated times at respective steps and is used as an evaluation index. In this way, it is possible to establish a delivery plan (a shelf conveyance plan) for the carrier AC more accurately.

A method of calculating the evaluation index is not limited to the above-described example. For example, an estimation model for estimating an evaluation index may be learned from the records of past picking operations and simulation data using a machine learning technique, and an estimation result obtained by the learning model may be used as an evaluation index.

Description will be continued by returning to FIG. 5. The order management device 201 selects one combination (a combination of the deposit shelf DS, the carrier AC that conveys the deposit shelf DS, the sorting shelf SS, and the carrier AC that conveys the sorting shelf) which minimizes the evaluation index among the combinations illustrated in the table 30A in FIG. 10. In the example of FIG. 10, a combination of which the combination number 301 is "NO. 2" is selected since the combination has the smallest evaluation index of "30".

The order management device 220 instructs the operation management device 230 to perform conveying on the basis of the combination selected in step S25 (S26). Furthermore, the order management device 220 transmits the details of the operation to the terminal PC and displays the details of the operation on the screen of the terminal PC (S27).

The present embodiment provides advantageous effects similar to those of the first embodiment. Furthermore, in the present embodiment, the estimated time for starting an operation at the Work Station WST is calculated as the evaluation index from the estimated time required for the carrier AC to convey the deposit shelf DS and the sorting shelf SS to the Work Station WST. In the present embodiment, a combination of the deposit shelf DS, the sorting shelf SS, and the carrier AC, which shortens the operation start time at the Work Station WST is selected on the basis of the evaluation index. In this way, according to the present embodiment, it is possible to shorten the time required for completion of a sorting operation and improve the efficiency of the picking operation.

In the present embodiment, as illustrated in FIG. 2, a sorting operation of articles deposited in the deposit shelves DS2 and DS4 is performed on the sorting shelf SS at the Work Station WST1. Moreover, after the sorting shelf SS is moved to the Work Station WST2, a sorting operation of articles stored in another deposit shelf DS1 is performed. A combination of the deposit shelf DS and the sorting shelf SS having been subjected to a sorting operation at the Work Station WST1 may be further subjected to a sorting operation at the Work Station WST2.

Alternatively, a combination of the deposit shelf DS and the sorting shelf SS having been subjected to a sorting operation at a first Work Station WST may be moved to another Work Station WST and be subjected to a sorting operation again. In this way, for example, when a worker W of the first Work Station does not have a qualification to perform sorting of certain articles, the deposit shelf DS and the sorting shelf SS can be conveyed to another Work Station WST where a worker W having a qualification to perform sorting of the articles whereby the shelves are subjected to a sorting operation.

Alternatively, when the worker W of the first station is a picking robot and has a limitation on articles that the worker W can sort, the deposit shelf DS and the sorting shelf SS are conveyed to a Work Station WST where a human worker W is deployed. In this way, articles that a picking robot cannot sort can be sorted by a human worker W.

The present invention is not limited to the above-described embodiment. Those skilled in the art can make various additions and changes within the scope of the present invention. In the above-described embodiment, the present invention is not limited to the configuration example illustrated in the accompanying drawings. The configuration and the processing method of the embodiment can be changed appropriately within a range where the object of the present invention is attained.

In addition, each constituent element of the present invention can be selected arbitrarily, and an invention having the selected constitution element is also included in the present invention. Furthermore, the configurations described in the claims can be combined other than those combinations specified in the claims.

REFERENCE SIGNS LIST

1 System
100 Warehouse
200 Control device
201 Order information acquisition function
202 Shelf information acquisition function
203 Conveyance plan establishment and instruction function
204 Work plan establishment and instruction function
210 Warehouse management system (WMS)
220 Order management device
230 Operation management device
DS Deposit shelf
SS Sorting shelf
AC Carrier
WST Work Station
G Gate
PC Terminal

The invention claimed is:

1. A picking assistance system that supports a picking operation, comprising:
 a plurality of movable shelves configured to be able to accommodate at least one article; and
 a control device configured to control the movement of each of the shelves, wherein
  the control device causes a series of processes of moving a sorting shelf selected from the shelves to a work station selected from a plurality of work stations, and moving articles from a deposit shelf disposed at the selected work station to the sorting shelf by a picking operation,
  the sorting shelf continuously moves to another work station of the plurality of work stations to move articles from a deposit shelf disposed at the another work station to the sorting shelf during a subsequent picking operation, wherein the sorting shelf continues to move to a further work station to repeat the picking operation until the selected sorting shelf accommodates all the predetermined articles,
  the control device moves the sorting shelf from a first predetermined position to a second predetermined position when a picking operation satisfies a predetermined condition at the second predetermined position, once items are filled at the first predetermined position, and
  the predetermined condition occurs when an estimated operation completion time required to complete a picking operation at the second predetermined position is less than or equal to a predetermined threshold.

2. The picking assistance system according to claim 1, wherein
 the deposit shelf disposed at the work station is selected from the shelves.

3. The picking assistance system according to claim 2, wherein the causing the series of processes of moving the selected sorting shelf to the work station by the control device further comprises providing instructions for accommodating the predetermined articles in the selected sorting shelf.

4. The picking assistance system according to claim 3, wherein
 the control device moves the selected sorting shelf that has accommodated all of the predetermined articles to a shipping place, and the control device returns the selected sorting shelf to a shelf storage location comprising a plurality of shelves after the articles accommodated in the sorting shelf have been picked out at the shipping place.

5. A picking assistance method for assisting a picking operation of moving articles to a movable shelf using a computer, the computer executing:
 selecting a sorting shelf from a plurality of movable shelves capable of accommodating at least one article;
 moving articles from a first deposit shelf to the sorting shelf by a picking operation performed at a predetermined position;
 moving the sorting shelf to a subsequent predetermined position; and
 moving articles from a second deposit shelf to the sorting shelf by a picking operation performed at the subsequent predetermined position, wherein the sorting shelf continuously moves to another work station of the plurality of work stations to move articles from a deposit shelf disposed at the another work station to the sorting shelf during a subsequent picking operation, the sorting shelf continues to move to a further work station to repeat the picking operation until the selected sorting shelf accommodates all the predetermined articles, the computer moves the sorting shelf from the predetermined position to the subsequent predetermined position when a picking operation satisfies a predetermined condition at the subsequent predetermined position, once items are filled at the predetermined position, and the predetermined condition occurs when an estimated operation completion time required to complete a picking operation at the subsequent predetermined position is less than or equal to a predetermined threshold.

6. The picking assistance method according to claim 5, wherein
the first and second deposit shelves are selected from the plurality of movable shelves, and
the first and second deposit shelves are the same.

7. The picking assistance method according to claim 5, wherein
the first and second deposit shelves are different from each other.

8. The picking assistance method according to claim 5, wherein
the computer moves the sorting shelf from the predetermined position to the subsequent predetermined position when a picking operation is completed at the predetermined position.

9. The picking assistance method according to claim 5, wherein
the computer calculates the estimated operation completion time based on at least one of: the number of articles to be moved from the second deposit shelf to the sorting shelf by a picking operation, a type of the articles, and the number of sorting destinations thereof.

10. A picking assistance method for assisting a picking operation of moving articles to a
movable shelf using a computer, the computer executing:
selecting a sorting shelf from a plurality of movable shelves capable of accommodating at least one article;
moving articles from a first deposit shelf to the sorting shelf by a picking operation performed at a predetermined position;
moving the sorting shelf to a subsequent predetermined position; and
moving articles from a second deposit shelf to the sorting shelf by a picking operation performed at the subsequent predetermined position, wherein
the sorting shelf continuously moves to another work station of the plurality of work stations to move articles from a deposit shelf disposed at the another work station to the sorting shelf during a subsequent picking operation, the sorting shelf continues to move to a further work station to repeat the picking operation until the selected sorting shelf accommodates all the predetermined articles, the computer moves the sorting shelf from the predetermined position to the subsequent predetermined position when a picking operation satisfies a predetermined condition at the subsequent predetermined position, once items are filled at the predetermined position, and the predetermined condition occurs when an estimated operation start time required to start a picking operation at the subsequent predetermined position is less than or equal to a predetermined threshold.

11. The picking assistance method according to claim 10, wherein
the estimated operation start time is calculated using at least one of: a time required for the second deposit shelf to arrive at the subsequent predetermined position, and a time required for the sorting shelf to arrive at the subsequent predetermined position.

* * * * *